United States Patent
Gaertner et al.

(10) Patent No.: US 11,335,205 B2
(45) Date of Patent: May 17, 2022

(54) DETERMINING A RUNWAY EXIT FOR LANDING AN AIRCRAFT

(71) Applicant: The Boeing Company, Chicago, IL (US)

(72) Inventors: Marco Gaertner, Sinntal-Sannerz (DE); Jendrick Westphal, Hünstetten (DE)

(73) Assignee: The Boeing Company, Chicago, IL (US)

( * ) Notice: Subject to any disclaimer, the term of this patent is extended or adjusted under 35 U.S.C. 154(b) by 320 days.

(21) Appl. No.: 16/534,373

(22) Filed: Aug. 7, 2019

(65) Prior Publication Data

US 2021/0043097 A1    Feb. 11, 2021

(51) Int. Cl.
| | |
|---|---|
| G08G 5/06 | (2006.01) |
| G05B 23/02 | (2006.01) |
| G08G 5/00 | (2006.01) |
| G08G 5/02 | (2006.01) |
| B64F 5/40 | (2017.01) |
| B60T 17/22 | (2006.01) |

(52) U.S. Cl.
CPC ............... G08G 5/065 (2013.01); B64F 5/40 (2017.01); G05B 23/0283 (2013.01); G08G 5/0021 (2013.01); G08G 5/0026 (2013.01); G08G 5/025 (2013.01); B60T 17/221 (2013.01)

(58) Field of Classification Search
CPC ...... G08G 5/065; G08G 5/025; G08G 5/0021; G08G 5/0026; B64F 5/40; G05B 23/0283; B60T 17/221
See application file for complete search history.

(56) References Cited

U.S. PATENT DOCUMENTS

| | | | | |
|---|---|---|---|---|
| 7,818,100 B2* | 10/2010 | Goodman | ............. | B64C 25/426 701/16 |
| 8,478,460 B2* | 7/2013 | Hugues | ................. | G08G 5/065 701/16 |
| 10,037,704 B1* | 7/2018 | Myr | ........................ | G08G 5/025 |

(Continued)

FOREIGN PATENT DOCUMENTS

EP    3 626 552 A1    3/2020

OTHER PUBLICATIONS

Extended European Search Report dated Nov. 13, 2020 in the corresponding European Patent Application No. 20175033.8.

*Primary Examiner* — Dale W Hilgendorf
(74) *Attorney, Agent, or Firm* — Womble Bond Dickinson (US) LLP

(57) ABSTRACT

An apparatus is provided. The apparatus determines a plurality of runway exits reachable by the aircraft, and applied braking force of the aircraft to land at respective ones of the plurality of runway exits and predicts taxi-in times of the aircraft to land at respective ones of the plurality of runway exits. The apparatus also predicts maintenance costs of the aircraft to land at respective ones of the plurality of runway exits based on the applied braking force and predicts overall costs of the aircraft to land at respective ones of the plurality of runway exits based on the taxi-in times and the maintenance costs. The apparatus further determines the runway exit among the plurality of runway exits, the runway exit having a minimal overall cost among the overall costs and presents a recommendation of the runway exit for landing the aircraft to a user.

21 Claims, 4 Drawing Sheets

(56) References Cited

U.S. PATENT DOCUMENTS

| | | | | |
|---|---|---|---|---|
| 10,417,919 B1* | 9/2019 | Jayathirtha | ............ | B64C 25/426 |
| 2006/0243857 A1* | 11/2006 | Rado | ..................... | B64C 25/426 |
| | | | | 244/111 |
| 2007/0208466 A1* | 9/2007 | Meunier | .............. | G05D 1/0083 |
| | | | | 701/16 |
| 2010/0001882 A1* | 1/2010 | Jeddi | ...................... | G08G 5/025 |
| | | | | 340/961 |
| 2010/0042267 A1 | 2/2010 | Goodman et al. | | |
| 2017/0129623 A1* | 5/2017 | Brardo | .................. | B60T 8/1703 |
| 2017/0158177 A1 | 6/2017 | Sharma | | |
| 2018/0067480 A1* | 3/2018 | Ellis | ..................... | G08G 5/0021 |
| 2021/0233419 A1* | 7/2021 | He | ...................... | G08G 5/0021 |

* cited by examiner

DETERMINING A RUNWAY EXIT FOR LANDING AN AIRCRAFT

TECHNOLOGICAL FIELD

The present disclosure relates generally to landing an aircraft, and in particular, to determining a runway exit for landing an aircraft.

BACKGROUND

During the landing procedure for an aircraft, the selection of a runway exit for landing has an influence on the overall operational cost of an aircraft. However, this selection is usually not optimized to reduce the overall operational cost of the aircraft. In one solution, during the landing procedure for an aircraft, the application of brakes on the aircraft is a manual action for the pilot. Depending on the pilot's experience, the applied braking force may be adjusted to land at a certain runway exit. In another solution, fixed braking force settings may be applied to land at a certain runway exit. However, these solutions only take the required braking force into account and do not propose an optimal runway exit or reduce the overall operational cost of the aircraft based on the selected runway exit.

Therefore, it would be desirable to have a system and method that takes into account at least some of the issues discussed above, as well as other possible issues.

BRIEF SUMMARY

Example implementations of the present disclosure are directed to determining a runway exit for landing an aircraft. Example implementations of the present disclosure can determine the best or optimal runway exit based on various factors, including at least maintenance costs, operational costs, and fuel costs. Example implementations of the present disclosure can provide a recommendation of the optimal runway exit to the pilot via either an automatic braking system or manual guidance cues. Example implementations of the present disclosure can provide the optimized runway exit recommendation based on both dynamic cost factors and overall operational efficiency.

By selecting the optimized runway exit for landing an aircraft, example implementations of the present disclosure can reduce the overall operational cost of the aircraft. Comparing to conventional solutions, example implementations of the present disclosure can propose the optimal runway exit by considering multiple factors in addition to the required braking force and can reduce the overall operational cost of the aircraft.

The present disclosure thus includes, without limitation, the following example implementations.

Some example implementations provide a method of determining a runway exit for landing an aircraft. The method comprises: determining a plurality of runway exits reachable by the aircraft, and applied braking force of the aircraft to land at respective ones of the plurality of runway exits; predicting taxi-in times of the aircraft to land at respective ones of the plurality of runway exits; predicting maintenance costs of the aircraft to land at respective ones of the plurality of runway exits based on the applied braking force; predicting overall costs of the aircraft to land at respective ones of the plurality of runway exits based on the taxi-in times and the maintenance costs; determining the runway exit among the plurality of runway exits, the runway exit having a minimal overall cost among the overall costs; and presenting a recommendation of the runway exit for landing the aircraft to a user.

In some example implementations of the method of any preceding example implementation, or any combination of preceding example implementations, predicting maintenance costs of the aircraft includes predicting brake wear costs of the aircraft to land at the respective ones of the plurality of runway exits.

In some example implementations of the method of any preceding example implementation, or any combination of preceding example implementations, predicting brake wear costs of the aircraft includes predicting the brake wear costs of the aircraft based on a maintenance schedule of the aircraft.

In some example implementations of the method of any preceding example implementation, or any combination of preceding example implementations, predicting brake wear costs of the aircraft includes predicting the brake wear costs of the aircraft based on force applied to brakes of the aircraft when landing.

In some example implementations of the method of any preceding example implementation, or any combination of preceding example implementations, predicting overall costs of the aircraft includes: predicting fuel costs and operational costs of the aircraft to land at the respective ones of the plurality of runway exits based on the taxi-in times; and predicting overall costs of the aircraft based on the fuel costs, the operational costs and the maintenance costs.

In some example implementations of the method of any preceding example implementation, or any combination of preceding example implementations, presenting the recommendation of the runway exit includes presenting a quantitative value of the minimal overall cost to the user.

In some example implementations of the method of any preceding example implementation, or any combination of preceding example implementations, the method further comprises determining an updated runway exit in response to an instance that the aircraft lands in an area different from a designated area to land.

Some example implementations provide an apparatus for determining a runway exit for landing an aircraft. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for determining a runway exit for landing an aircraft. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
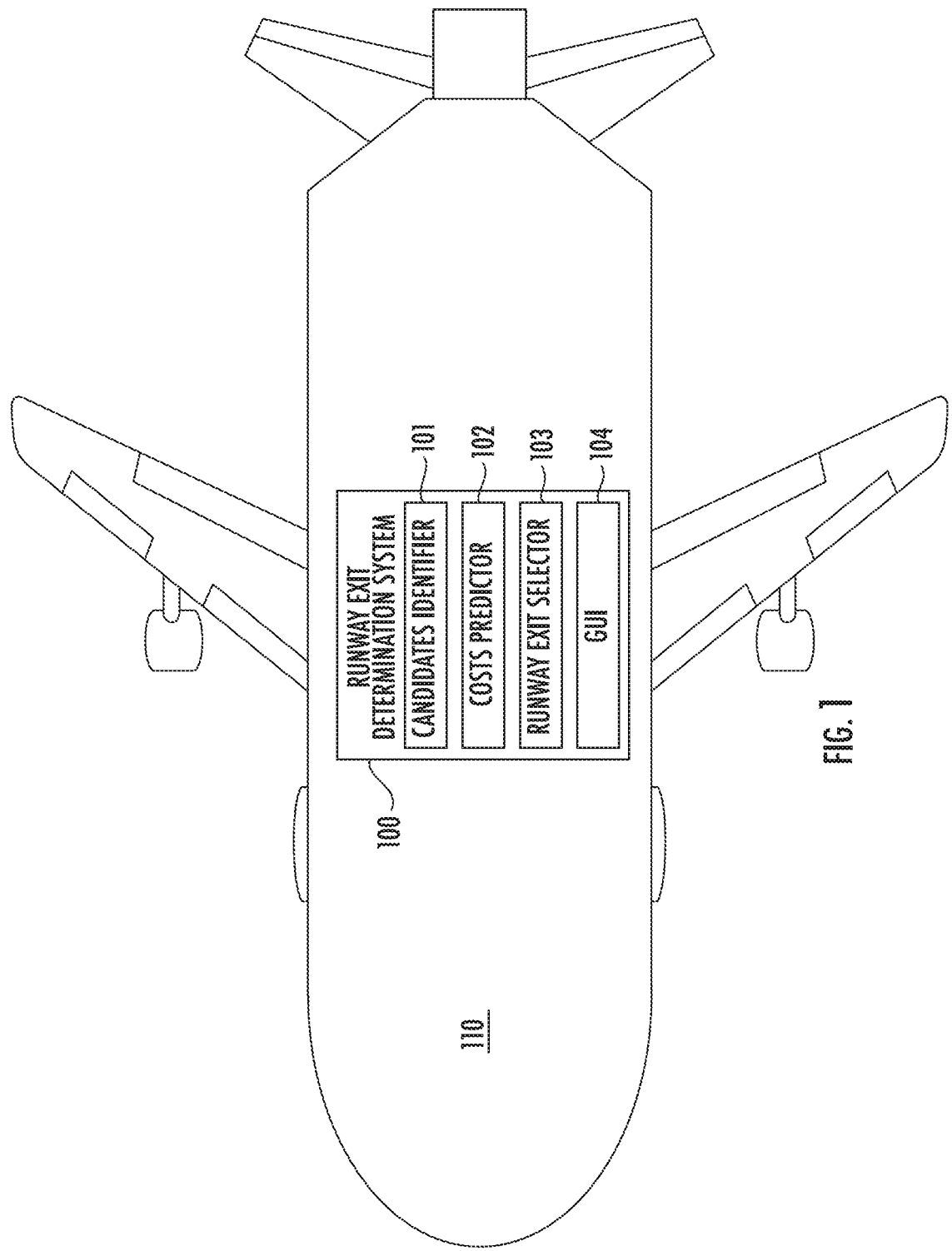
FIG. 1 illustrates a system for determining a runway exit for landing an aircraft, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to landing an aircraft, and in particular, to determining a runway exit for landing an aircraft.

FIG. 1 illustrates a runway exit determination system 100 for determining a runway exit for landing an aircraft 110, according to example implementations of the present disclosure. In some examples, as described in greater detail with reference to FIG. 4, the system may be implemented by an apparatus for determining a runway exit for landing an aircraft. In one example, the system may be on-board the aircraft. In another example, the system may be remote from but in communication with the aircraft over a suitable wireless communication link.

The runway exit determination system 100 includes any of a number of different subsystems (each an individual system) for performing one or more functions or operations. As shown, in some examples, the system includes one or more of each of a candidates identifier 101, a costs predictor 102, a runway exit selector 103 and a graphical user interface (GUI) 104. The subsystems may be co-located or directly coupled to one another, or in some examples, various ones of the subsystems may communicate with one another across one or more computer networks. Further, although shown as part of the system, it should be understood that any one or more of the candidates identifier, costs predictor, runway exit selector and GUI may function or operate as a separate system without regard to any of the other subsystems. It should also be understood that the system may include one or more additional or alternative subsystems than those shown in FIG. 1.

In some examples, the candidates identifier 101 is configured to determine a plurality of runway exits reachable by the aircraft 110, and applied braking force of the aircraft to land at respective ones of the plurality of runway exits. For example, the candidates identifier can determine the plurality of runway exits reachable by the aircraft based on the speed, direction and fuel condition of the aircraft, and distances to the plurality of runway exits. The plurality of runway exits may be candidate runway exits for landing the aircraft. In another example, the candidates identifier can determine what braking force should be applied for the aircraft to land at each of the plurality of runway exits. The applied braking force may be indicated by required brake settings to land at each of the plurality of runway exits.

The candidates identifier 101 can provide information of the plurality of runway exits to the costs predictor 102. In some examples, the costs predictor is configured to predict taxi-in times of the aircraft 110 to land at respective ones of the plurality of runway exits. For an aircraft, the taxi-in time may be the time period between the actual landing time of the aircraft and the actual in-block time of the aircraft. The actual landing time of the aircraft may be the time that aircraft touches down, and the actual in-block time of the aircraft may be the time when the brakes of the aircraft have been engaged at the parking position of the gate. In one example, the costs predictor can predict the taxi-in times of the aircraft to land at each of the plurality of runway exit based on an estimated actual landing time and assigned taxi routes for the plurality of runway exits.

In some examples, the costs predictor 102 is configured to predict maintenance costs of the aircraft 110 to land at respective ones of the plurality of runway exits based on the applied braking force. In these examples, the costs predictor is configured to predict brake wear costs of the aircraft to land at the respective ones of the plurality of runway exits. To predict the brake wear costs of the aircraft, in some examples, the costs predictor is configured to predict the brake wear costs of the aircraft based on a maintenance schedule of the aircraft. The maintenance schedule of the aircraft may indicate the time that brakes of the aircraft are scheduled to be replaced and the facility that can replace one or more of the brakes. In one example, the brake wear costs may be lower if the aircraft lands at a runway exit where the facility to replace the brakes is nearby. In other examples, the brake wear costs may be predicted based on other factors such as force applied to the brakes of the aircraft when landing, or the capability to replace one or more of the brakes at the facility.

In some examples, the costs predictor 102 is configured to predict overall costs of the aircraft 110 to land at respective ones of the plurality of runway exits based on the taxi-in times and the maintenance costs. In these examples, the costs predictor is configured to predict fuel costs and operational costs of the aircraft to land at the respective ones of the plurality of runway exits based on the taxi-in times. For example, for each of predicted taxi-in times, the costs predictor can predict fuel costs during the taxi-in time period. The costs predictor can also predict operational costs of the aircraft such as time costs to arrive and park at the gate. In some examples, the costs predictor is configured to predict overall costs of the aircraft based on the fuel costs, the operational costs and the maintenance costs. The overall costs may be a summation of the fuel costs, the operational costs and the maintenance costs. For example, the fuel costs, the operational costs and the maintenance costs may be represented by quantities of money, and the overall costs may be a summation of the quantities of money.

The costs predictor 102 can provide information of the predicted overall costs to the runway exit selector 103. In some examples, the runway exit selector is configured to determine the runway exit among the plurality of runway exits for landing the aircraft 110. The runway exit has a minimal overall cost among the predicted overall costs for the aircraft to land at the plurality of runway exits. The selected runway exit may be the optimal runway exit for landing the aircraft. The selected runway exit may be dynamically updated, such as with one or more of the above variables on which selected runway exit is determined. In some examples, the runway exit selector 103 is configured to determine an updated runway exit in response to an instance that the aircraft lands in an area different from a designated area to land.

The runway exit selector 103 can provide information of the selected runway exit to the GUI 104. In some examples, the GUI is configured to present a recommendation of the runway exit for landing the aircraft 110 to a user such as a pilot of the aircraft. In these examples, the GUI is configured to present a quantitative value of the minimal overall cost to the user. For example, the minimal overall cost can be a quantity of money, and the GUI can present the quantity of money to the user.

Figure 2:
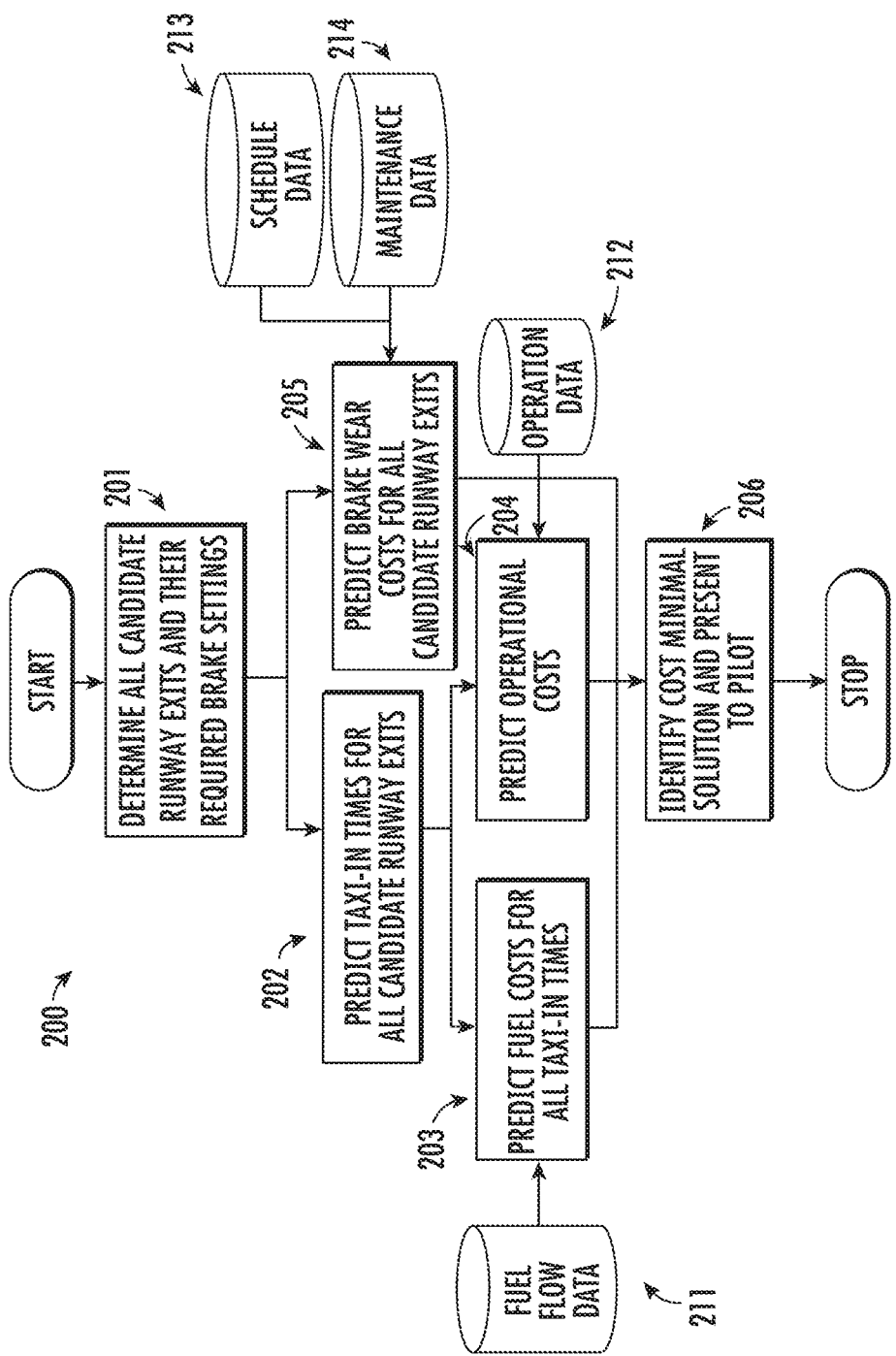
FIG. 2 illustrates a flow diagram illustrating a method for determining a runway exit for landing an aircraft, according to example implementations of the present disclosure.

FIG. 2 illustrates a flow diagram 200 illustrating a method for determining a runway exit for landing the aircraft 110, according to example implementations of the present disclosure. As shown, at block 201, the candidates identifier 101 can determine all candidate runway exits for landing and their required brake settings to land at the candidate runway exits. For example, the candidates identifier can determine the candidate runway exits reachable by the aircraft based on the speed, direction and fuel condition of the aircraft, and distances to the candidate runway exits.

At block 202, the costs predictor 102 can predict taxi-in times of the aircraft 110 to land at all the candidate runway exits. For example, the costs predictor can predict the taxi-in times of the aircraft to land at each of the candidate runway exit based on an estimated actual landing time and assigned taxi routes for the candidate runway exits. After the taxi-in times are predicted, at block 203, the costs predictor can predict fuel costs for all predicted taxi-in times. In one example, the costs predictor can predict the fuel costs based on fuel flow data 211 stored in a database. At block 204, the costs predictor can also predict operational costs to land at the candidate runway exits. The operational costs may include time costs dependent on arrival of the aircraft at the gate. The operational costs may be predicted based on operation data 212 stored in a database.

At block 205, the costs predictor 102 can predict brake wear costs of the aircraft 110 to land at all candidate runway exits. The costs predictor can predict the brake wear costs based on schedule data 213 and maintenance data 214 stored in one or more databases. The schedule data and maintenance data may indicate the time that the brake wear is scheduled to be replaced and the facility that can replace the brake wear.

After the fuel costs, operational costs and brake wear costs are predicted, the costs predictor 102 can predict overall costs of the aircraft 110 to land at the candidate runway exits. For example, the fuel costs, the operational costs and the brake wear costs may be represented by quantities of money, and the overall costs may be a summation of the quantities of money.

After the overall costs of the aircraft 110 to land at the candidate runway exits are predicted, at block 206, the runway exit selector 103 can identify the cost minimum solution. For example, the cost minimum solution may indicate a selected runway exit having a minimal overall cost among the predicted overall costs for the aircraft to land at the candidate runway exits. Also, at block 206, the GUI 104 can identify a cost minimal solution and present a recommendation of the selected runway exit for landing the aircraft to a pilot. The pilot may operate the aircraft to land at the selected runway exit according to the recommendation. In another example, the runway exit selector 103 can provide the recommendation of the selected runway exit to an autopilot system onboard the aircraft. The selected runway exit may be achieved by manual or automatic control of the braking after the aircraft has touched down (landed) at the runway.

Figure 3:
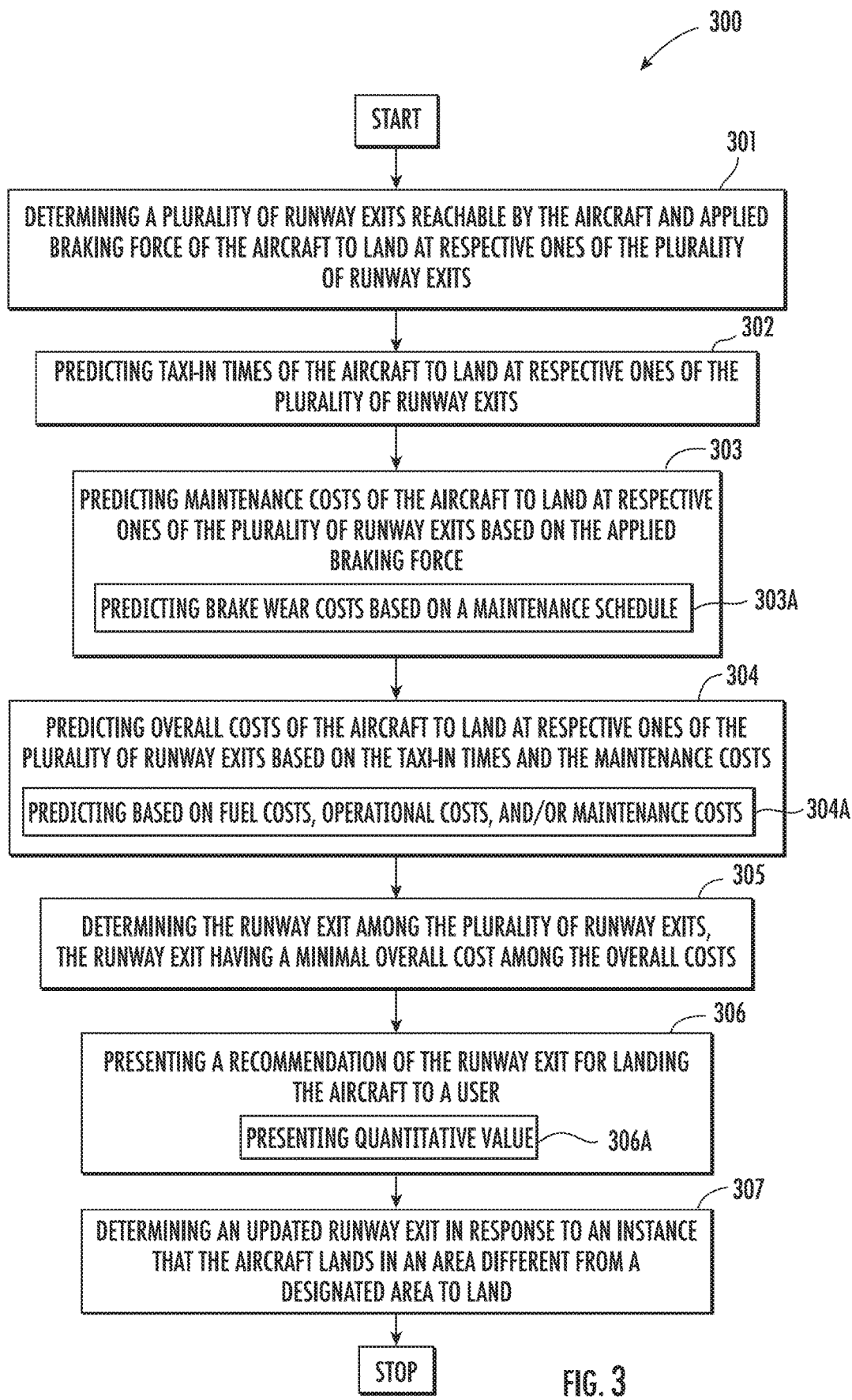
FIG. 3 illustrates a flowchart of various operations in a method of determining a runway exit for landing an aircraft, according to example implementations of the present disclosure.

FIG. 3 illustrates a flowchart of various operations in a method 300 of determining a runway exit for landing the aircraft 110, according to example implementations of the present disclosure. As shown, at block 301, the method includes determining a plurality of runway exits reachable by the aircraft, and applied braking force of the aircraft to land at respective ones of the plurality of runway exits. At block 302, the method includes predicting taxi-in times of the aircraft to land at respective ones of the plurality of runway exits. At block 303, the method includes predicting maintenance costs of the aircraft to land at respective ones of the plurality of runway exits based on the applied braking force. Block 303 may include a sub-block 303A. In sub-block 303A, the method includes predicting brake wear costs based on a maintenance schedule. At block 304, the method includes predicting overall costs of the aircraft to land at respective ones of the plurality of runway exits based on the taxi-in times and the maintenance costs. Block 304 may include a sub-block 304A. In sub-block 304A, the method includes predicting the overall costs of the aircraft based on fuel costs, operational costs, and/or maintenance costs. At block 305, the method includes determining the runway exit among the plurality of runway exits, the runway exit having a minimal overall cost among the overall costs. At block 306, the method includes presenting a recommendation of the runway exit for landing the aircraft to a user. The presented recommendation represents the identified cost minimal solution having a quantified value. Block 306 may include a sub-block 306A. In sub-block 306A, the method includes presenting the quantitative value of the minimal overall cost to the user. At block 307, the method includes determining an updated runway exit in response to an instance that the aircraft lands in an area different from a designated area to land.

According to example implementations of the present disclosure, the runway exit determination system 100 and its subsystems including the candidates identifier 101, costs predictor 102, runway exit selector 103 and GUI 104 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
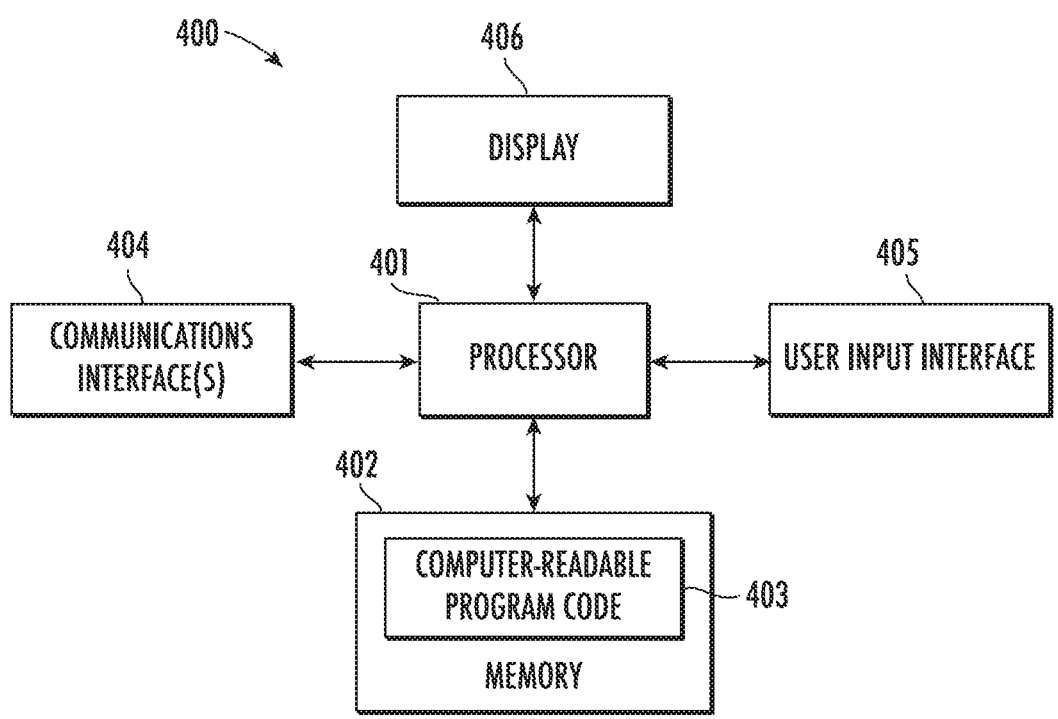
FIG. 4 illustrates an apparatus according to some example implementations.

FIG. 4 illustrates an apparatus 400 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 401 (e.g., processing circuitry) connected to a memory 402 (e.g., storage device). In some examples, the apparatus 400 implements the runway exit determination system 100.

The processor 401 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 402 (of the same or another apparatus).

The processor 401 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 402 is generally any piece of computer hardware that is capable of storing information such as, for example, data, computer programs (e.g., computer-readable program code 403) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 402, the processor 401 may also be connected to one or more interfaces for displaying, transmitting and/or receiving information. The interfaces may include a communications interface 404 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 406 and/or one or more user input interfaces 405 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, keyboard or keypad, joystick, touch-sensitive surface (separate from or integrated into a touchscreen), biometric sensor or the like. The user interfaces may further include one or more interfaces for communicating with peripherals such as printers, scanners or the like. In some examples, the user interfaces include the GUI 104.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 400 may include a processor 401 and a computer-readable storage medium or memory 402 coupled to the processor, where the processor is configured to execute computer-readable program code 403 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for determining a runway exit for landing an aircraft, the apparatus comprising a processor and a memory storing executable instructions that, in response to execution by the processor, cause the apparatus to:
   determine a plurality of runway exits reachable by the aircraft, and applied braking force of the aircraft to land at respective ones of the plurality of runway exits;
   predict taxi-in times of the aircraft to land at respective ones of the plurality of runway exits;
   predict maintenance costs of the aircraft to land at respective ones of the plurality of runway exits based on the applied braking force;
   predict overall costs of the aircraft to land at respective ones of the plurality of runway exits based on the taxi-in times and the maintenance costs;
   determine the runway exit among the plurality of runway exits, the runway exit having a minimal overall cost among the overall costs;
   present a recommendation of the runway exit for landing the aircraft to a user, wherein the recommendation is based on the runway exit having the minimal overall cost; and
   determine an updated runway exit at landing in response to an instance that the aircraft lands in an area different from a designated area to land.

2. The apparatus of claim 1, wherein the apparatus being caused to predict maintenance costs of the aircraft includes being caused to predict brake wear costs of the aircraft to land at the respective ones of the plurality of runway exits.

3. The apparatus of claim 2, wherein the apparatus being caused to predict brake wear costs of the aircraft includes being caused to predict the brake wear costs of the aircraft based on a maintenance schedule of the aircraft.

4. The apparatus of claim 2, wherein the apparatus being caused to predict brake wear costs of the aircraft includes being caused to predict the brake wear costs of the aircraft based on force applied to brakes of the aircraft when landing.

5. The apparatus of claim 1, wherein the apparatus being caused to predict overall costs of the aircraft includes being caused to:
   predict fuel costs and operational costs of the aircraft to land at the respective ones of the plurality of runway exits based on the taxi-in times.

6. The apparatus of claim 5, wherein the apparatus being caused to predict overall costs of the aircraft includes being caused to:
   predict overall costs of the aircraft based on the fuel costs, the operational costs and the maintenance costs.

7. The apparatus of claim 1, wherein the apparatus being caused to present the recommendation of the runway exit includes being caused to present a quantitative value of the minimal overall cost to the user.

8. A method of determining a runway exit for landing an aircraft, comprising:
   determining a plurality of runway exits reachable by the aircraft, and applied braking force of the aircraft to land at respective ones of the plurality of runway exits;
   predicting taxi-in times of the aircraft to land at respective ones of the plurality of runway exits;
   predicting maintenance costs of the aircraft to land at respective ones of the plurality of runway exits based on the applied braking force;
   predicting overall costs of the aircraft to land at respective ones of the plurality of runway exits based on the taxi-in times and the maintenance costs;
   determining the runway exit among the plurality of runway exits, the runway exit having a minimal overall cost among the overall costs;
   presenting a recommendation of the runway exit for landing the aircraft to a user, wherein the recommendation is based on the runway exit having the minimal overall cost; and
   determining an updated runway exit at landing in response to an instance that the aircraft lands in an area different from a designated area to land.

9. The method of claim 8, wherein predicting maintenance costs of the aircraft includes predicting brake wear costs of the aircraft to land at the respective ones of the plurality of runway exits.

10. The method of claim 9, wherein predicting brake wear costs of the aircraft includes predicting the brake wear costs of the aircraft based on a maintenance schedule of the aircraft.

11. The method of claim 9, wherein predicting brake wear costs of the aircraft includes predicting the brake wear costs of the aircraft based on force applied to brakes of the aircraft when landing.

12. The method of claim 8, wherein predicting overall costs of the aircraft includes:
predicting fuel costs and operational costs of the aircraft to land at the respective ones of the plurality of runway exits based on the taxi-in times.

13. The method of claim 12, wherein predicting overall costs of the aircraft includes:
predicting overall costs of the aircraft based on the fuel costs, the operational costs and the maintenance costs.

14. The method of claim 8, wherein presenting the recommendation of the runway exit includes presenting a quantitative value of the minimal overall cost to the user.

15. A computer-readable storage medium for determining a runway exit for landing an aircraft, the computer-readable storage medium being non-transitory and having computer-readable program code stored therein that in response to execution by a processor, causes an apparatus to:
determine a plurality of runway exits reachable by the aircraft, and applied braking force of the aircraft to land at respective ones of the plurality of runway exits;
predict taxi-in times of the aircraft to land at respective ones of the plurality of runway exits;
predict maintenance costs of the aircraft to land at respective ones of the plurality of runway exits based on the applied braking force;
predict overall costs of the aircraft to land at respective ones of the plurality of runway exits based on the taxi-in times and the maintenance costs;
determine the runway exit among the plurality of runway exits, the runway exit having a minimal overall cost among the overall costs;
present a recommendation of the runway exit for landing the aircraft to a user, wherein the recommendation is based on the runway exit having the minimal overall cost; and
determine an updated runway exit at landing in response to an instance that the aircraft lands in an area different from a designated area to land.

16. The computer-readable storage medium of claim 15, wherein the apparatus being caused to predict maintenance costs of the aircraft includes being caused to predict brake wear costs of the aircraft to land at the respective ones of the plurality of runway exits.

17. The computer-readable storage medium of claim 16, wherein the apparatus being caused to predict brake wear costs of the aircraft includes being caused to predict the brake wear costs of the aircraft based on a maintenance schedule of the aircraft.

18. The computer-readable storage medium of claim 16, wherein the apparatus being caused to predict brake wear costs of the aircraft includes being caused to predict the brake wear costs of the aircraft based on force applied to brakes of the aircraft when landing.

19. The computer-readable storage medium of claim 15, wherein the apparatus being caused to predict overall costs of the aircraft includes being caused to:
predict fuel costs and operational costs of the aircraft to land at the respective ones of the plurality of runway exits based on the taxi-in times.

20. The computer readable storage medium of claim 19, wherein the apparatus being caused to predict overall costs of the aircraft includes being caused to:
predict overall costs of the aircraft based on the fuel costs, the operational costs and the maintenance costs.

21. The computer-readable storage medium of claim 15, wherein the apparatus being caused to present the recommendation of the runway exit includes being caused to present a quantitative value of the minimal overall cost to the user.

* * * * *